United States Patent
Mano et al.

(10) Patent No.: US 11,924,097 B2
(45) Date of Patent: Mar. 5, 2024

(54) TRAFFIC MONITORING DEVICE, METHOD AND PROGRAM

(71) Applicant: Nippon Telegraph and Telephone Corporation, Tokyo (JP)

(72) Inventors: Toru Mano, Musashino (JP); Yukio Tsukishima, Musashino (JP); Tomoya Hibi, Musashino (JP); Junki Ichikawa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/917,296

(22) PCT Filed: Apr. 14, 2020

(86) PCT No.: PCT/JP2020/016372
§ 371 (c)(1),
(2) Date: Oct. 6, 2022

(87) PCT Pub. No.: WO2021/210056
PCT Pub. Date: Oct. 21, 2021

(65) Prior Publication Data
US 2023/0179519 A1    Jun. 8, 2023

(51) Int. Cl.
*H04L 12/721*    (2013.01)
*H04L 12/26*    (2006.01)
*H04L 43/062*    (2022.01)
*H04L 45/00*    (2022.01)

(52) U.S. Cl.
CPC ............ *H04L 45/70* (2013.01); *H04L 43/062* (2013.01)

(58) Field of Classification Search
CPC ....... H04L 43/02; H04L 43/026; H04L 43/06; H04L 43/062; H04L 43/10–106; G06F 12/02; G06F 12/0223; G06F 12/0292; G06F 12/06
See application file for complete search history.

(56) References Cited

U.S. PATENT DOCUMENTS

| | | |
|---|---|---|
| 2011/0289112 A1 | 11/2011 | Kamimura et al. |
| 2013/0091319 A1 | 4/2013 | Cho |
| 2014/0153571 A1* | 6/2014 | Neugebauer ............ H04L 47/18 370/392 |

(Continued)

FOREIGN PATENT DOCUMENTS

| | | | |
|---|---|---|---|
| CN | 105553695 A | * 5/2016 | ......... H04L 41/0695 |
| CN | 107248939 | 10/2017 | |

OTHER PUBLICATIONS

PCT Written Opinion PCT-JP2020-016372 (Year: 2020).*

(Continued)

*Primary Examiner* — Boris D Grijalva Lobos
(74) *Attorney, Agent, or Firm* — Fish & Richardson P.C.

(57) ABSTRACT

An object of the present disclosure is to make it possible to measure an IP flow corresponding to time-varying, high-speed traffic. The present disclosure is a device that monitors traffic in a network, the device comprising a memory that records, for each flow in the network, metadata and flow information to be used in measurement, wherein a traffic state is forecasted using a packet flowing in the network; and a recording area for the metadata and the flow information in the memory is set based on the forecasted traffic state.

9 Claims, 16 Drawing Sheets

(56) References Cited

U.S. PATENT DOCUMENTS

2019/0007280 A1\* 1/2019 Sarangam ............. H04L 43/026
2019/0044869 A1\* 2/2019 Wang .................... G06F 11/302

OTHER PUBLICATIONS

Decision to Grant a Patent (J-platpat) (Year: 2023).\*
Morin, "Open Data Structures," AU Press Athabasca University, 2013, retrieved from URL <http://www.aupress.ca/index.php/books/120226>, 336 pages.

\* cited by examiner

TRAFFIC MONITORING DEVICE, METHOD AND PROGRAM

CROSS-REFERENCE TO RELATED APPLICATIONS

This application is a National Stage application under 35 U.S.C. § 371 of International Application No. PCT/JP2020/016372, having an International Filing Date of Apr. 14, 2020.

The disclosure of the prior application is considered part of the disclosure of this application, and is incorporated by reference in its entirety into this application.

TECHNICAL FIELD

The present disclosure is a technique for processing IP flow measurement at high speed with respect to a large amount of traffic per unit time.

BACKGROUND ART

In IP (Internet Protocol) networks, traffic measurement is a necessary technique for day-to-day management, operation, and billing, as well as an important task for providing necessary information for facility planning, capacity design, traffic engineering, and security management. IP flow measurement is one of the typical IP traffic measurements. Statistics such as the numbers of packets and bytes per flow are measured. For example, NetFlow, sFlow, and ipfix are used. Here, a flow refers to granularity of observation, and includes an IP address pair (source address, destination address), an IP 5Tuple (source IP address, destination IP address, protocol number, source port, destination port), or the like. The IP5 tuple may be denoted as 5Tuple.

In IP flow measurement, the flow to which a packet belongs is identified and the corresponding counter is updated for each received packet. For high-speed traffic, this counter update also needs to be processed at high speed.

CITATION LIST

Non Patent Literature

[NPL 1] Pat Jr, Morin. "Open Data Structures." AU Press Athabasca University, 2013. http://www.aupress.ca/index.php/books/120226

SUMMARY OF THE INVENTION

Technical Problem

In IP flow measurement, which is traffic measurement for IP networks, statistics for each flow are measured at regular time intervals, recorded in a hash table in a memory and then stored in a hard disk, and flows in the next fixed time interval are measured. The above procedure is repeated. In order to receive a packet and record flow information in the hash table, it is necessary to search for a recording area of the hash table in the memory. Data transfer between a CPU (Central Processing Unit) and the memory during this search is performed for each cache line, which is a multi-byte area unit of the hash table. For this reason, the number of times of data transfer may increase and the recording of IP flows may take longer time depending on the memory layout of data stored in the hash table and the memory occupancy rate. If the processing speed in such IP flow measurement some packets are not recorded and correct flow information cannot be measured.

An object of the present disclosure is to make it possible to measure an IP flow corresponding to time-varying, high-speed traffic.

Means for Solving the Problem

A traffic monitoring device according to the present disclosure includes not only a packet receiving unit, a flow data recording unit, and a flow data output unit, but also a traffic feature value calculation unit for forecasting the traffic state in the next measurement zone based on time-series data of the number of previously measured flows; and a flow data layout method determination unit for selecting a memory layout method that reduces the number of memory accesses, based on the forecasted traffic state.

Specifically, a traffic monitoring device according to the present disclosure is
a device that monitors traffic in a network, the device including
a memory that records, for each flow in the network, metadata and flow information to be used in measurement,
wherein a traffic state is forecasted using a packet flowing in the network; and
a recording area for the metadata and the flow information in the memory is set based on the forecasted traffic state.

Specifically, a traffic monitoring method according to the present disclosure is
a traffic monitoring method to be executed by a traffic monitoring device that monitors traffic in a network,
the traffic monitoring device including a memory that records, for each flow in the network, metadata and flow information to be used in measurement,
the method including:
forecasting a traffic state using a packet flowing in the network; and
setting a recording area for the metadata and the flow information in the memory based on the forecasted traffic state.

Specifically, a traffic monitoring program according to the present disclosure is a program for causing a computer to achieve each functional unit included in the traffic monitoring device according to the present disclosure, and is a program for causing a computer to execute each step included in the traffic monitoring method according to the present disclosure.

Effects of the Invention

According to the present disclosure, an optimal memory layout for the next measurement zone is determined based on the history of previous IP to measure IP flows, thus enabling IP flow measurement capable of dealing with time-varying, high-speed traffic.

DESCRIPTION OF EMBODIMENTS

Hereinafter, an embodiment of the present disclosure will be described in detail with reference to the drawings. Note that the present disclosure is not limited to the embodiment described below. These implementation examples are only illustrative, and the present disclosure can be implemented in various modified and improved modes based on the knowledge of those skilled in the art. Note that constituent elements with the same reference signs in the specifications and the drawings are identical to each other.

(Overview)

In order to achieve IP flow measurement, which is typical IP traffic measurement, for high-speed traffic, it is necessary to update a counter for each received packet at high speed. To achieve high-speed IP flow measurement on a general-purpose server, the number of memory accesses in counter update processing needs to be reduced. Proposed is a method of reducing the number of memory accesses by changing memory layouts in a data structure for recording flow information used in IP flow measurement, in accordance with the traffic state. Although the present disclosure describes an example of using a hash table for recording to a memory, the present disclosure is applicable to any memory where counter update processing is performed.

1. Hash Table

A hash table [e.g., see NPL 1] is a data structure used in high-speed IP flow measurement. A hash table has a data structure that efficiently stores and updates key-value pairs. In a hash table, flow information is recorded and updated by using the hash table with a flow as a key and a counter as a value. A hash table enables high-speed recording and update since search, insertion, and update can be achieved with O(1). High-speed IP flow measurement can be achieved by speeding up the processing of the hash table.

Figure 1:
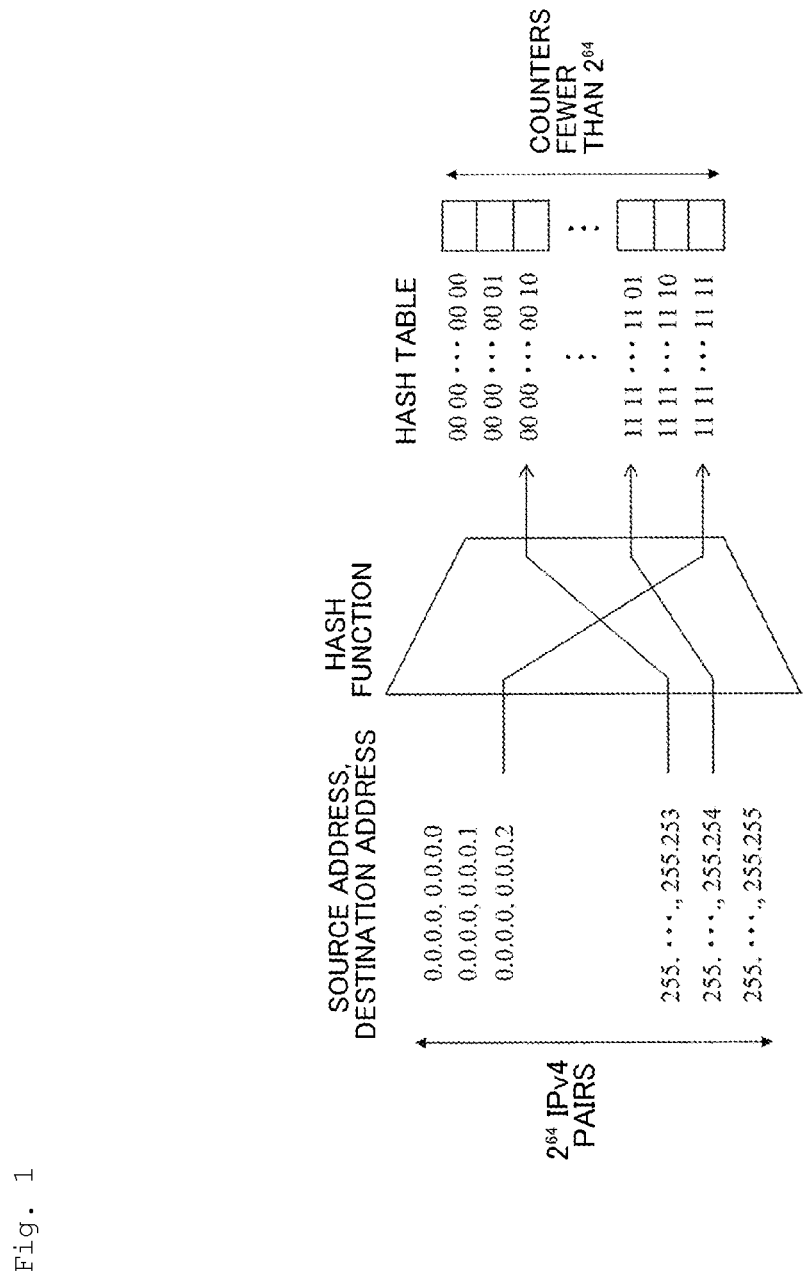
FIG. 1 shows an example of a hash table with IPv4 pairs as keys.

A hash table calculates a key hash value and stores a value at a corresponding memory address (FIG. 1). A hash value is calculated with a hash function. The hash function is a function that converts an input to a fixed-length 0-1 bit string. The hash function is, for example, cyclic redundancy check (CRC), SHA-1, MurmurHash or the like.

FIG. 1 shows an example of a hash table with keys that are pairs of a source address and a destination address as defined in IPv4. Since there is a prospect that different keys have the same hash value (hash collision), keys are stored together with values in the hash table.

There are two main methods to deal with hash collision. Specifically, open addressing and chaining are available. In chaining, a list corresponding to each hash value is prepared in advance. In the event of a hash collision, it is added to this list.

Figure 2:
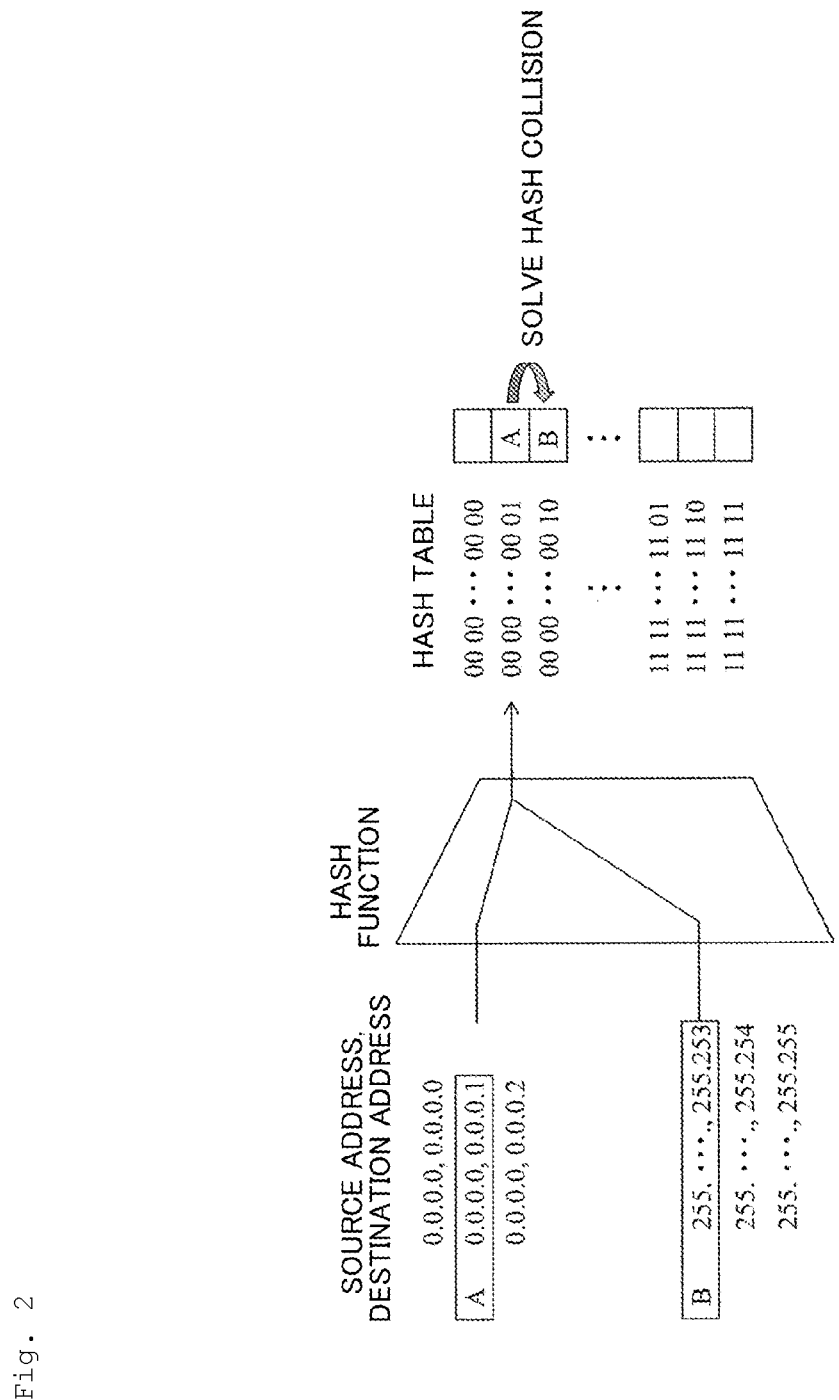
FIG. 2 shows an example of solving hash collision using open addressing with linear search.

In open addressing, a fixed-length array is prepared for each hash value, and a key-value pair is directly stored in this array. In the event of a hash collision, a key-value pair is stored in an empty element in the array. Various methods have been proposed to deal with the state where there is no empty element, but in open addressing with linear search, a key-value pair is stored in an empty element in the array corresponding to the next hash value (FIG. 2). If there is no empty element here either, the array corresponding to the following hash value is checked. Thus, an empty element is searched for linearly from an adjacent sequence.

In FIG. 2, an element A and an element B have the same hash value, and the element A is already stored at the original storage location of the element B, where a hash collision has occurred. The element B is stored at the location corresponding to the next hash value (10 in binary notation).

2. Problem

In order to achieve high-speed IP flow measurement, a hash table is needed that reduces the number of memory accesses with consideration given to cache lines and, given the limited amount of available memory.

In order to achieve high-speed IP flow measurement, it is necessary to reduce memory access, which is a performance bottleneck in a hash table. This is because the memory access speed is relatively slow compared to the processing speed of a CPU. General-purpose servers have a hierarchical memory structure, which includes a plurality of cache memories and a main memory. Each of the cache memories has a small capacity but is a high-speed one, whereas the main memory has a large capacity but is a low-speed one.

In the present disclosure, the following situation is envisioned.

- No key-value pairs in a hash table are present in a cache memory, and all other data is present in the cache memory.
- A large number of IP flows is measured.
- The capacity of the cache memory is small, and most of the large number of key-value pairs corresponding to the large number of IP flows cannot be stored in the cache memory.
- Access to the main memory is counted as the number of memory accesses.
- Main memory access accounts for most of the processing time since the cache memory can be accessed at high speed.

When no hash collision occurs, memory access to retrieve one key-value pair is sufficient for a counter update. For example, when no hash collision occurs in inserting a hash value, the key-value pair corresponding to the hash value is empty. Thus, a pair is recorded here and insertion processing ends.

On the other hand, when a hash collision occurs, two or more key-value pairs need to be accessed in order to search for an empty key-value pair. For example, in FIG. 2, the element A and the element B have the same hash value 1, and there is a hash collision. When the element B is inserted after the element A has been inserted, it is necessary to access two key-value pairs, one corresponding to the hash value 1 and the other corresponding to the adjacent hash value 2.

Accordingly, it is necessary to reduce the number of hash collisions and the memory access required to process the collisions.

The following two points need to be considered to reduce the memory access.

(1) The available memory is limited.

The larger the size of the hash space, the smaller the probability of hash collision. However, the hash space cannot be infinitely increased since there is a limit to the amount of available memory.

(2) The number of memory accesses is not calculated from the number of bytes, but is the number of cache lines accessed.

Figure 3:
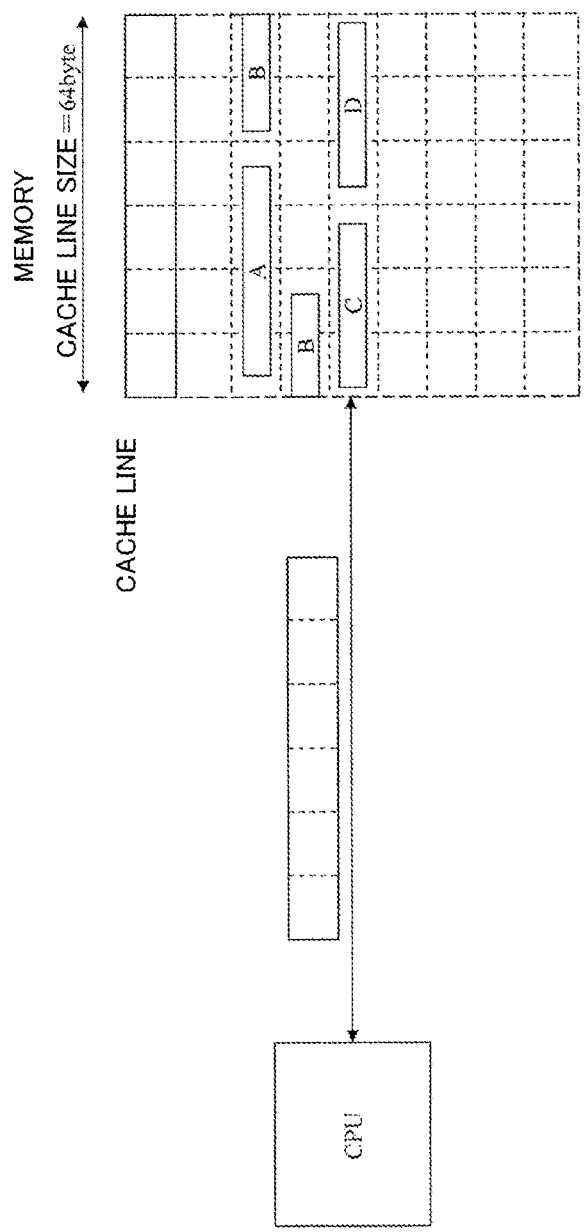
FIG. 3 illustrates a problem with a hash table.

Data transfer between the CPU and the memory is performed not bit-by-bit but area-by-area, each area consisting of a plurality of bytes (FIG. 3). This unit is called a cache line or a cache block. The size of this area is 64 bytes in Intel (registered trademark) and AMD (Advanced Micro Devices) (registered trademark) CPUs used in general-purpose servers.

For example, when data is stored across two cache lines, the number of memory accesses required to retrieve the data is two. In FIG. 3, data A is stored in a third cache line, and data B is stored across third and fourth cache lines. Data C and D are stored in a fifth cache line. Cache line transfer is required only once to access the data A, but is required twice to access the data B. Cache line transfer is also required only once to access both the data C and D.

Therefore, a method is needed that lays out key-value pairs so that the number of memory accesses deriving from hash collisions is reduced within the amount of available memory.

3. Detailed Description of Developed Technique

The developed technique reduces the number of memory accesses by changing memory layouts in the hash table for recording flow information used in IP flow measurement, in accordance with the traffic state. As for the traffic state, consideration can be given to any information that may affect the load on the memory. Possible examples of the traffic state include the number of packets of which flow information has been retrieved and the number of different flows observed. In addition, any information that can be retrieved from packets such as a packet length may also be used.

To describe the developed technique, a description will be first given of the number of memory accesses, that is, the number of cache line accesses varying depending on the memory layout of data in the hash table. Next, the overview of the developed technique will be described. Lastly, specific examples of a method for changing memory layouts will be described where IP traffic is measured for each of the respective following flows.

IPv4 5Tuple

IPv6 Pair

IPv6 5tuple

Here, IPv4 5Tuple is the 5Tuple defined in IPv4. A source IP address in IPv4 may be referred to as "IPv4 src", a destination IP address in IPv4 may be referred to as "IPv4 dst", a source port number may be referred to as "Source port", and a destination port number may be referred to as "Destination port". The same applies to IPv6 5Tuple. An IPv6 Pair is a pair of a source address and a destination address defined using IPv6.

3.1 Memory Layout Method and Number of Memory Accesses

Figure 4:
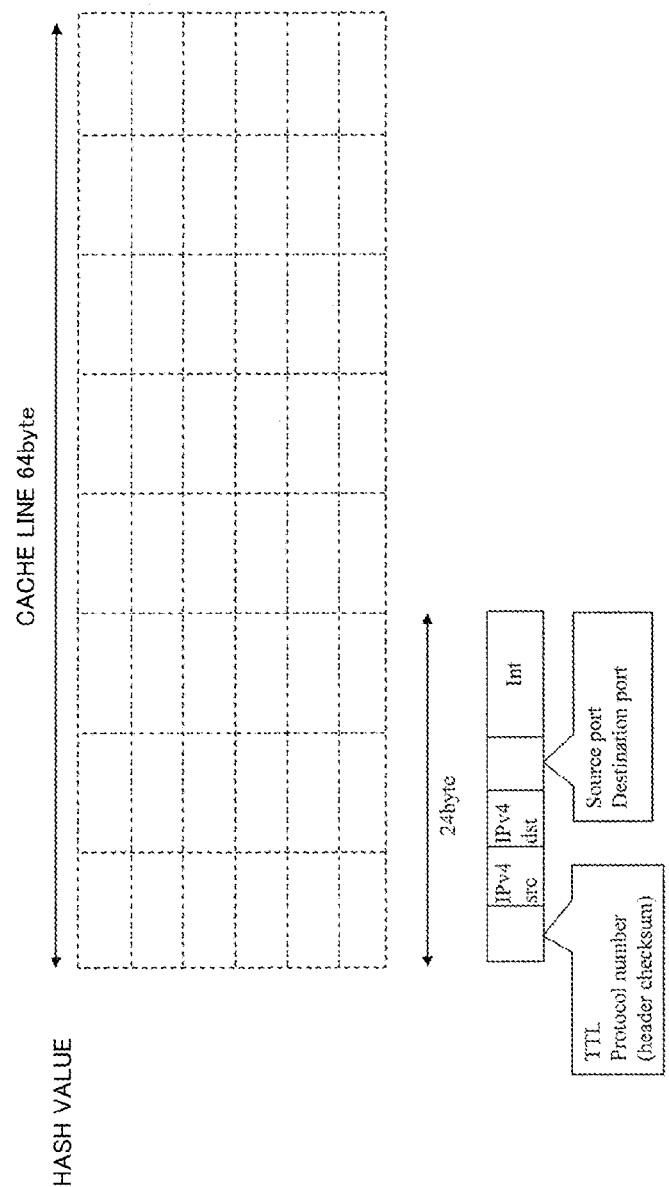
FIG. 4 shows an example of cache lines and element size in laying out packets (8 Bytes) for each IPv4 5Tuple.

A description will be given of the number of memory accesses, that is, the number of cache line accesses varying depending on the memory layout of data in the hash table. Consideration will be given to IP flow measurement in which the number of packets for each IPv4 5Tuple is measured (FIG. 4).

A key and a value in the hash table are as follows. A key is flow information, that is, IPv4 5Tuple, and is recorded in a 16-byte area. A value is the number of packets, and is, here, recorded as a 64-bit (8-byte) integer. Here, the total size of a key and a value is 24 bytes.

There are at least the following two data layout methods.

First layout method: A layout method on a cache line-by-cache line basis for reducing cache line access (FIG. 5)

Figure 6:
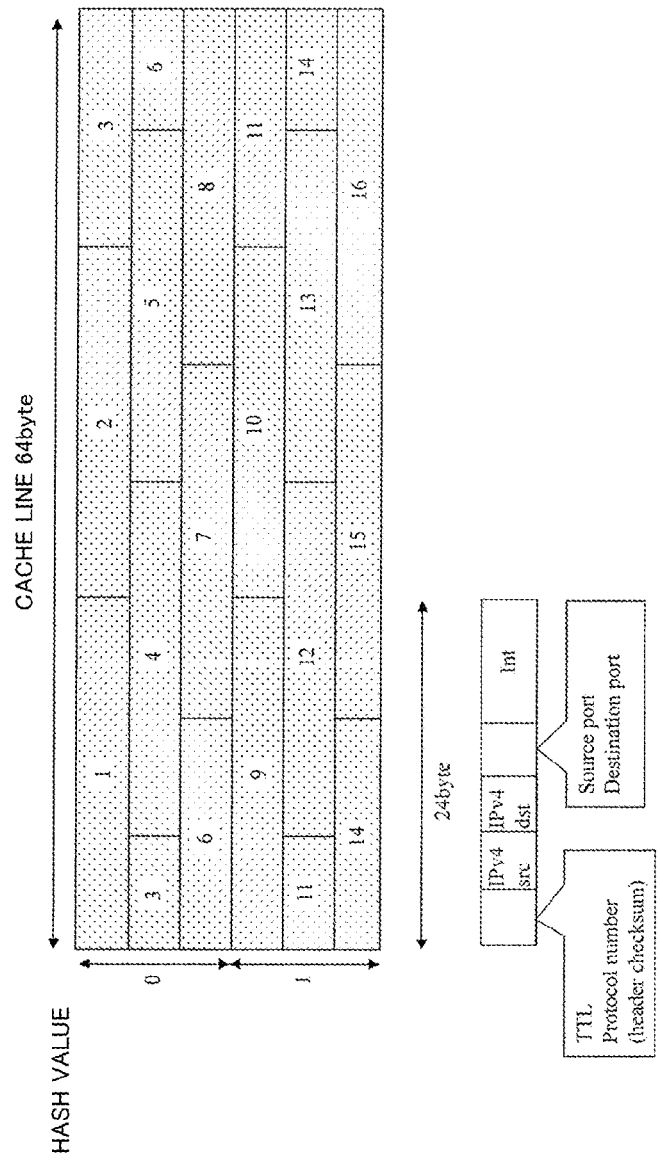
FIG. 6 shows an example of a layout in which elements are spread all over a memory area.

Second layout method: A layout method of spreading elements all over the available memory area to effectively use the memory area (FIG. 6)

Figure 5:
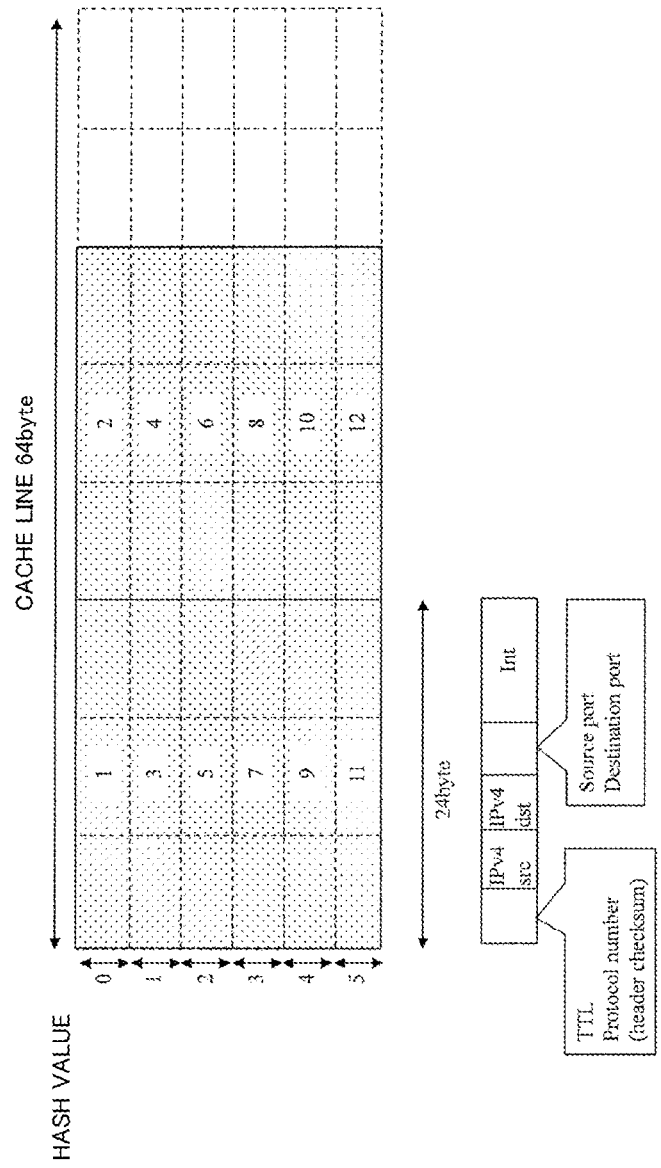
FIG. 5 shows an example of a data layout on a cache line-by-cache line basis.

3.1.1 Description of First Layout Method (FIG. 5)

A cache line is 64 bytes, while the total size of a key and a value is 24 bytes. In the layout method on a cache line-by-cache line basis for reducing cache line access, two elements are arranged from the top area of each cache line. This allows any element to be accessed by accessing one of cache lines.

The rear area of each cache line is unused.

When the amount of available memory is N lines in terms of cache lines, the maximum hash space is N, and the maximum number of elements that can be stored is 2N.

3.1.2 Description of Second Layout Method (FIG. 6)

In the layout method of spreading elements all over the available memory area, the elements are laid out without gaps in the available memory area. There is no unused space in each cache line.

Since some of the elements are laid out across a plurality of cache lines, a plurality of memory accesses may be required to access these elements.

When the amount of available memory is N lines in terms of cache lines, the maximum hash space is N/3, and the maximum number of elements that can be stored is 8N/3.

3.1.3 Memory Layout and Number of Accesses

For example, to access the third element, only the second cache line needs to be accessed in the first layout method (FIG. 5), but the first and second cache lines need to be accessed in the second layout method (FIG. 6).

In addition, the hash space in the first layout method is larger than that in the second layout method, and the number of elements that can be stored in the second layout method is larger than that in the first layout method.

For these reasons, the number of memory accesses is different even when the same element set is inserted. Quantitative differences will be described later.

3.2 Overview of Developed Technique

Figure 7:
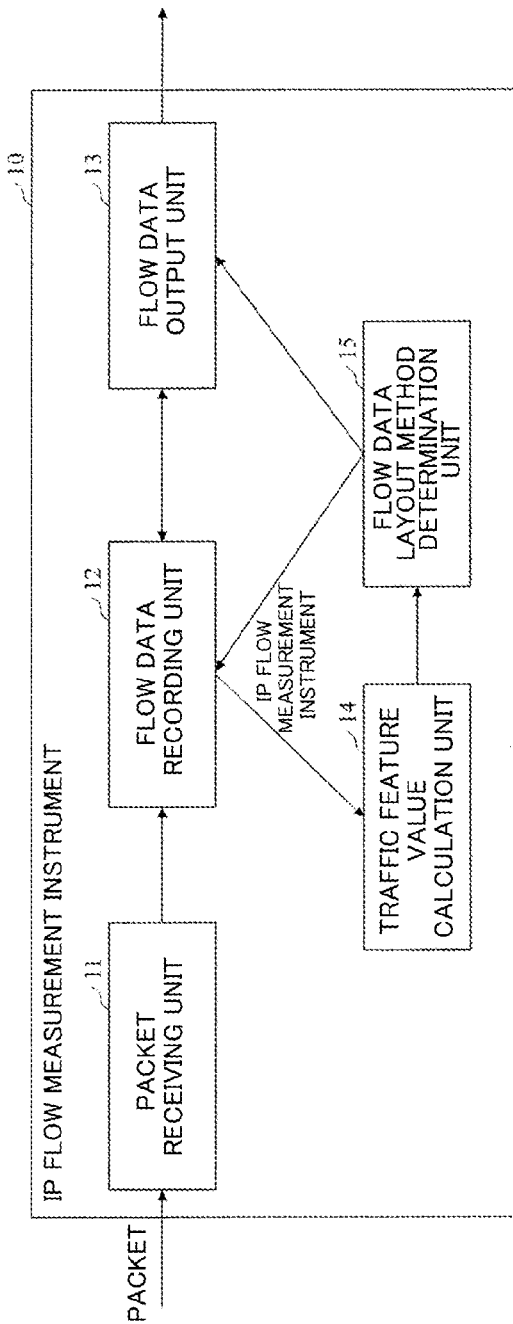
FIG. 7 shows an example of a device configuration according to the present disclosure.

An ordinary IP flow measurement instrument receives a packet, records flow data, and outputs the flow data. In contrast, the present disclosure also includes a traffic feature value calculation unit and a flow data layout determination unit (FIG. 7). First, the operation of the ordinary IP flow measurement instrument will be described, and the operation of the developed technique will then be described as a difference.

3.2.1 Configuration and Operation of Conventional Technique

The ordinary IP flow measurement instrument includes a packet receiving unit 11, a flow data recording unit 12, and a flow data output unit 13. That is, the ordinary IP flow measurement instrument has a configuration of FIG. 7 from which a traffic feature value calculation unit 14 and a flow data layout determination unit 15 are removed. Here, IP flow measurement refers to measuring and recording statistics for each flow at regular time intervals. For example, it refers to measuring the traffic (number of bytes) per IPv4 pair, and recording flow information measured in the last 10 seconds, every 10 seconds. The flow type, the statistics, and the time interval are determined by a network administrator based on the characteristics of the network being managed, the situation, information needed at the time, or the like.

The packet receiving unit 11 receives packets from outside. The packet receiving unit 11 then reads a packet header of each of the received packets, extracts flow information and metadata of the packet, and inputs the extracted flow information and metadata to the flow data recording unit 12.

Here, flow information is information indicating a flow of the packet and contains any information that can be retrieved from the packet header. Flow information is different depending on the flow type to be measured. For example, when the flow type is the IPv4 pair, flow information is the source address and the destination address in IPv4.

Metadata is data used in measurement and contains one or more pieces of arbitrary data that can be retrieved from the packet header. When, for example, the data volume of each flow is measured, metadata is the packet length.

The flow data recording unit 12 receives the flow information and the metadata, and updates a counter corresponding to the flow based in the hash table. Specifically, the flow data recording unit 12 searches for the counter corresponding to the flow, updates the counter when there exists the counter or creates an entry when not, and sets a counter value based on the metadata. Assuming that, for example, the counter indicates traffic (the number of bytes), the flow data recording unit 12 adds the current packet length to the previous counter value when there exists the entry or creates an entry when not, and sets the counter value to the value of the length of the received packet. If the speed of this counter update processing is slower than the packet arrival speed, some packets are not recorded and correct flow information cannot be measured.

The flow data output unit 13 reads entries of all flows in the hash table at regular time intervals, and writes the read content to an external database or a local nonvolatile disk to persist it. This is because the hash table is stored in a volatile memory and is deleted from a nonvolatile memory after the application that measures the IP flow ends. The reason why the hash table is stored in a volatile memory is that a volatile memory has higher speed (e.g., the access speed between a main memory and a hard disk) than a non-volatile memory. After persisting the flow data, the flow data output unit 13 clears (initializes) all entries in the hash table to zero, and prepares for the next measurement.

3.2.2 Configuration and Operation of the Disclosed Technique

FIG. 7 shows an example of a system configuration according to the present disclosure. An IP flow measurement instrument 10 functions as a traffic monitoring device according to the present disclosure, and includes a packet receiving unit 11, a flow data recording unit 12, a flow data output unit 13, traffic feature value calculation unit 14, and a flow data layout determination unit 15. The device of the present disclosure can also be achieved by a computer and a program, and the program can be recorded in a recording medium or provided through a network.

In the conventional method, there is only one method for laying out entries in the hash table, whereas the IP flow measurement instrument 10 of the present disclosure changes layout methods according to the traffic state. The traffic feature value calculation unit 14 ascertains track of the traffic state. The flow data layout determination unit 15 determines a method for laying out entries in the hash table in accordance with the results. The flow data recording unit 12 lays out entries in the hash table in accordance with the determined layout method. The flow data output unit 13 also reads the entries of the hash table in accordance with the determined layout method.

A specific feature value calculation method of the traffic feature value calculation unit 14 will be described in the next section. In the next section, the number of flows is employed as the feature value of the flows. The traffic feature value calculation unit 14 forecasts the number of flows in the next measurement interval, and the flow data layout method determination unit 15 determines the entry layout method in accordance with this number. As an example, the operation of the traffic feature value calculation unit 14 and the flow data layout method determination unit 15 in measurement of each IPv6 pair will be described as follows.

The traffic feature value calculation unit 14 accumulates data of the number of flows measured during each measurement interval by recording the number of entries immediately before the hash table is reset by the flow data output unit 13 at each measurement interval (e.g., every 10 seconds). The traffic feature value calculation unit 14 then forecasts the number of flows that will appear during the next measurement from time-series data of the number of flows using the following typical statistical time-series forecast method, and inputs the forecast result, namely the number of flows to the flow data layout determination unit 15.

For example, the following statistical time-series forecast methods can be used.

Figure 13:
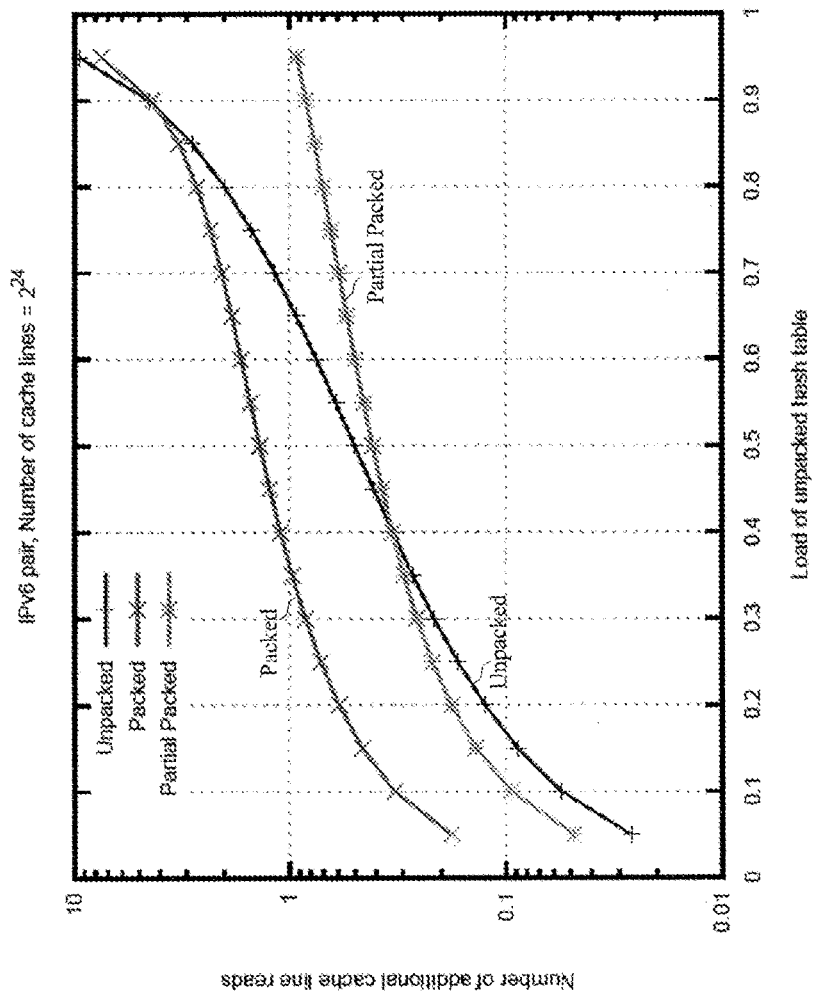
FIG. 13 shows an example of the number of memory accesses in IPv6 pair measurement.

Use the previous value
Autoregressive model
Moving average model
Autoregressive and moving average model
Autoregressive, integrated and moving average model The flow data layout determination unit 15 compares the forecasted number of flows with the maximum number of flows that can be accommodated by an unpacked layout method, and determines the layout method so as to minimize the number of memory accesses, based on FIG. 13. The maximum number of flows that can be accommodated by the unpacked layout method can be calculated from the amount of available memory.

Based on FIG. 13, the flow data layout determination unit 15 selects the unpacked layout method when the forecasted number of flows is 40% or less of the "maximum number of flows that can be accommodated by the unpacked layout method", and selects a partial packed layout method when not. The flow data layout determination unit 15 then delivers the selected layout method to the flow data recording unit 12 and the flow data output unit 13. The flow data recording unit 12 lays out entries in accordance with the layout method, and the flow data output unit 13 also reads the entries similarly in accordance with the layout method.

Thus, the method for laying out the flow data in the hash table is determined based on the feature value of the traffic. The number of memory accesses is reduced by adding the traffic feature value calculation unit 14 and the flow data layout determination unit 15 and changing the memory layouts in accordance with the traffic state. Other specific data layout methods will be described in the next section.

3.3 Determination of Specific Data Layout Method

A method for determining the memory layout in IP flow measurement will be described. The method will be described in terms of examples of measuring a value (number of packets, number of bites etc.) that can be stored as a 64-bit integer for each of the respective following three types of flows. Note that the measurement results are output to the outside at regular intervals, and the measurement data is cleared to zero at that time.

IPv4 5Tuple
IPv6 Pair
IPv6 5tuple

3.3.1 Measurement of Each Ipv4 5Tuple

First, three data layout methods will be described. Next, quantitative comparison of the number of memory accesses between the layouts will be described. Lastly, the method for determining the data layout will be described based on the above.

(Data Layout Method)

Consideration will be given to three memory layout methods, which are the above-described two methods and an intermediate method therebetween.

First layout method: A data layout on a cache line-by-cache line basis (FIG. 5). In this method, the flow data recording unit 12 lays out the flow information and metadata of each flow in a cache line different for each piece of flow information.

Second layout method: A layout in which elements are spread all over the memory area (FIG. 6). In this method, the flow data recording unit 12 lays out the flow information and metadata of each flow without gaps.

Figure 8:
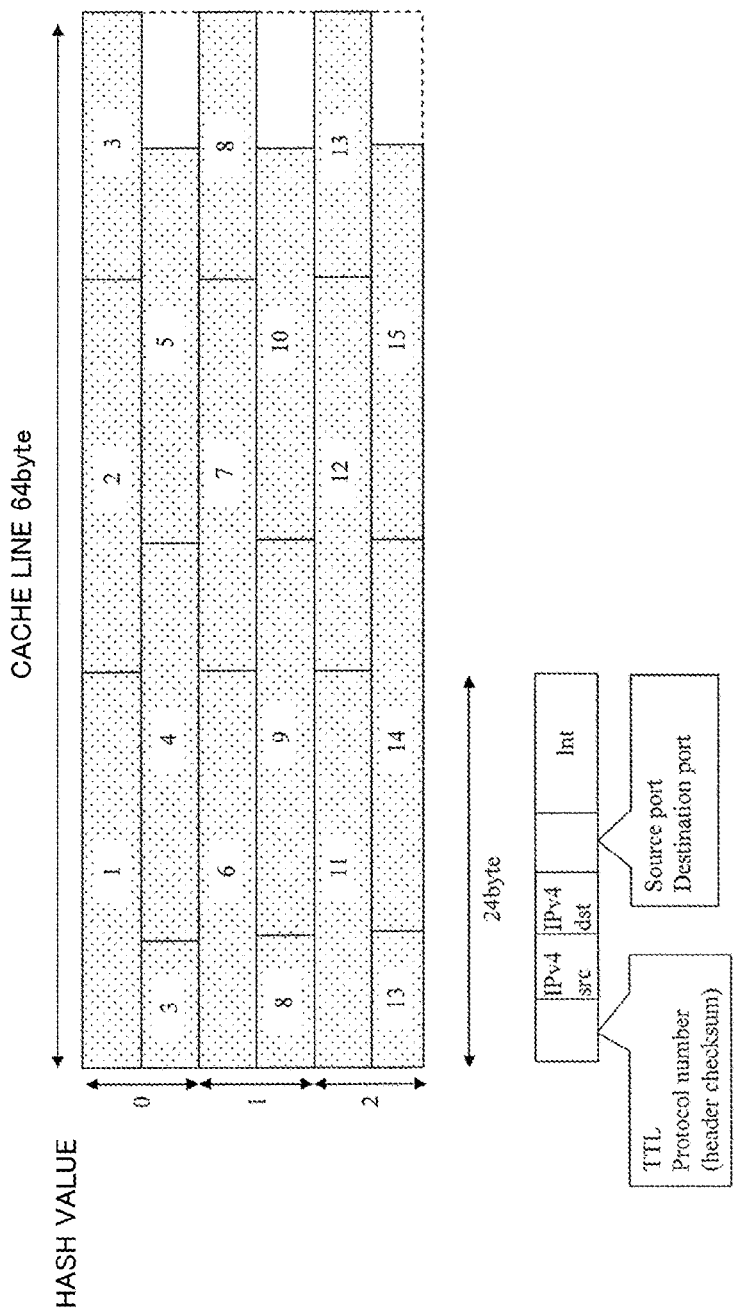
FIG. 8 shows an example of an intermediate layout.

Third layout method: An intermediate layout between first layout method and second layout method (FIG. 8). In this method, the flow data recording unit 12 lays out the flow information and metadata of each flow so that the number of flows each of which is laid out in one cache line is more than that of flows each of which is laid out in two separate cache lines.

For simplicity, the first layout method will be referred to as an unpacked layout, the second layout method will be referred to as a packed layout, and the third layout method will be referred to as a partial packed layout.

(Number of Memory Accesses)

Figure 9:
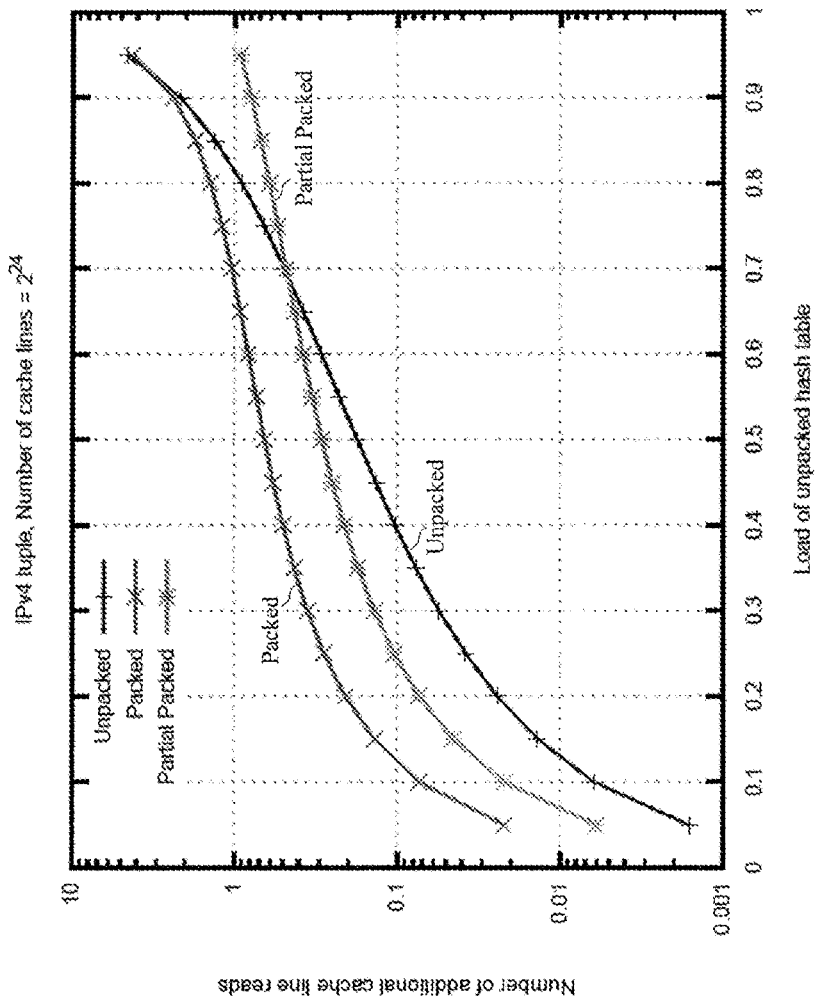
FIG. 9 shows an example of the number of memory accesses in IPv4 5Tuple measurement.

FIG. 9 shows the number of additional cache line accesses in successively inserting different uniform random elements into the hash table under the condition that the available memory area is 1 GiB ($1024^3$ bytes), that is, $2^{24}$ cache lines are available in terms of the number of cache lines. Since one cache line is always accessed in the insertion operation, values obtained by subtracting one for this access were plotted. The vertical axis indicates the number of cache line accesses, and the horizontal axis indicates the number of elements added. The number of elements added is expressed as a percentage such that the maximum number of elements that can be stored with the unpacked layout is 1. This is because the unpacked layout has the smallest number of elements that can be stored, of the three layout methods.

Here, in recording the flow information, the flow data recording unit 12 performs two types of processing: (1) searching to check if the element corresponding to the IP of the packet to be processed has already been recorded; and (2) searching for an empty area of the hash table and recording the element on condition that the IP is new and the element has not been recorded. For this reason, when the number of elements recorded in the hash table is relatively small, the unpacked layout is more advantageous as the search of (1) can be performed with a smaller number of accesses. On the other hand, when the number of recorded elements increases and the occupancy rate of the hash table increases, more cache lines need to be searched in the processing of (1) and (2) in the unpacked layout. Therefore, the packed or partial packed layout is more advantageous as it requires fewer lines to be searched. Accordingly, as the packets to be processed increases, the number of accesses increases more in the unpacked layout.

It can be confirmed from FIG. 9 that the unpacked layout minimizes the number of memory accesses when the number of elements to be inserted is 70% or less of the maximum number of elements that can be stored with the unpacked layout, and the partial packed layout minimizes the number of memory accesses when it is over 70%.

(Data Layout Determination Method)

The traffic feature value calculation unit 14 forecasts the number of flows to be observed in the next measurement zone (between the measurement result output and the next result output) based on the history of past traffic feature values. The flow data layout determination unit 15 compares this value with the maximum number of elements that can be stored with the unpacked layout to select the layout so as to minimize the number of memory accesses.

General time-series forecast can be used to forecast the number of flows. For example, the following methods can be used.

Use the previous value
Autoregressive model
Moving average model
Autoregressive and moving average model
Autoregressive, integrated and moving average model Based on FIG. 9, the unpacked layout is used when the forecast result is 70% or less of the maximum number of elements that can be stored with the unpacked layout, and the partial packed layout is used when it is over 70%.

3.3.2 Measurement of Each IPv6 Pair

First, three data layout methods will be described, as with IPv4 5Tuple. Next, quantitative comparison of the number of memory accesses between the layouts will be described. Lastly, the method for determining the data layout will be described based on the above.

(Data Layout Method)

The following three memory layout methods will be considered, as with IPv4 5Tuple.

Figure 10:
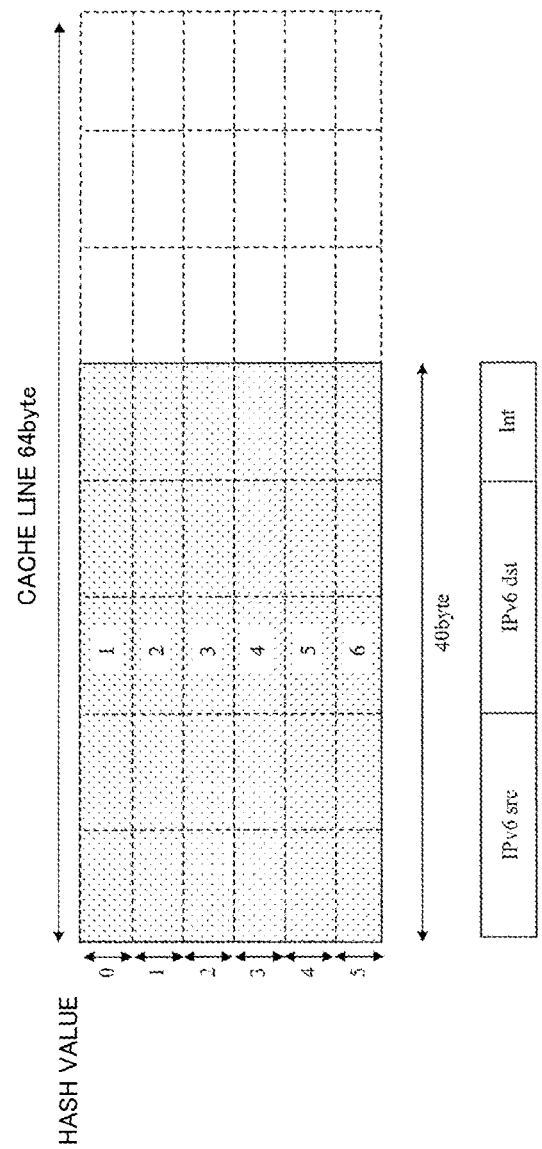
FIG. 10 shows an example of an unpacked layout of IPv6 pairs.

First layout method: A data layout on a cache line-by-cache line basis, i.e., the unpacked layout (FIG. 10)

Figure 11:
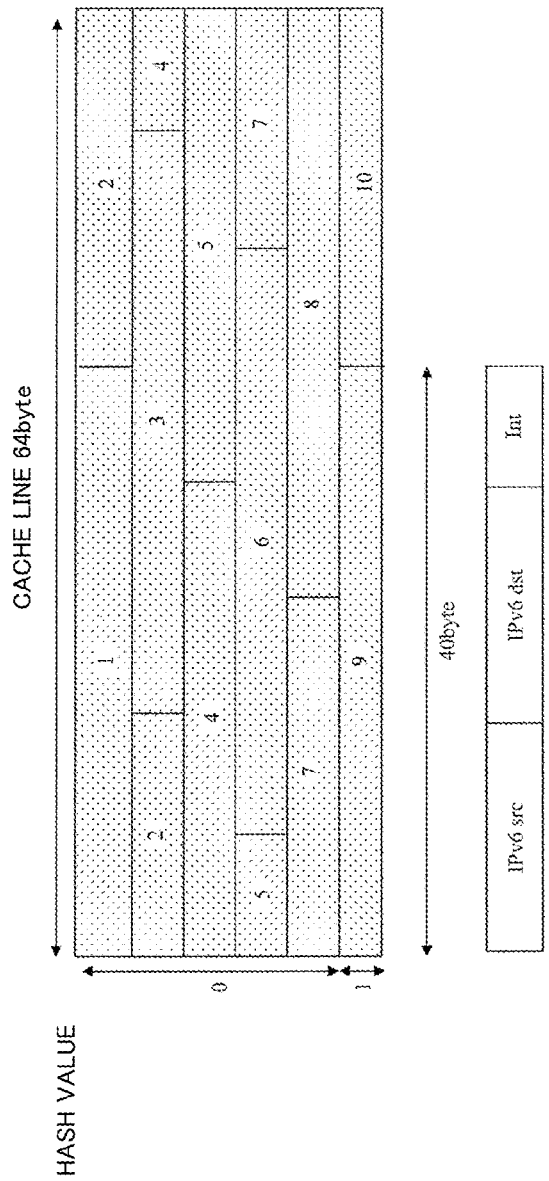
FIG. 11 shows an example of a packed layout of IPv6 pairs.

Second layout method: A layout in which elements are spread all over the memory area, i.e., the packed layout (FIG. 11)

Figure 12:
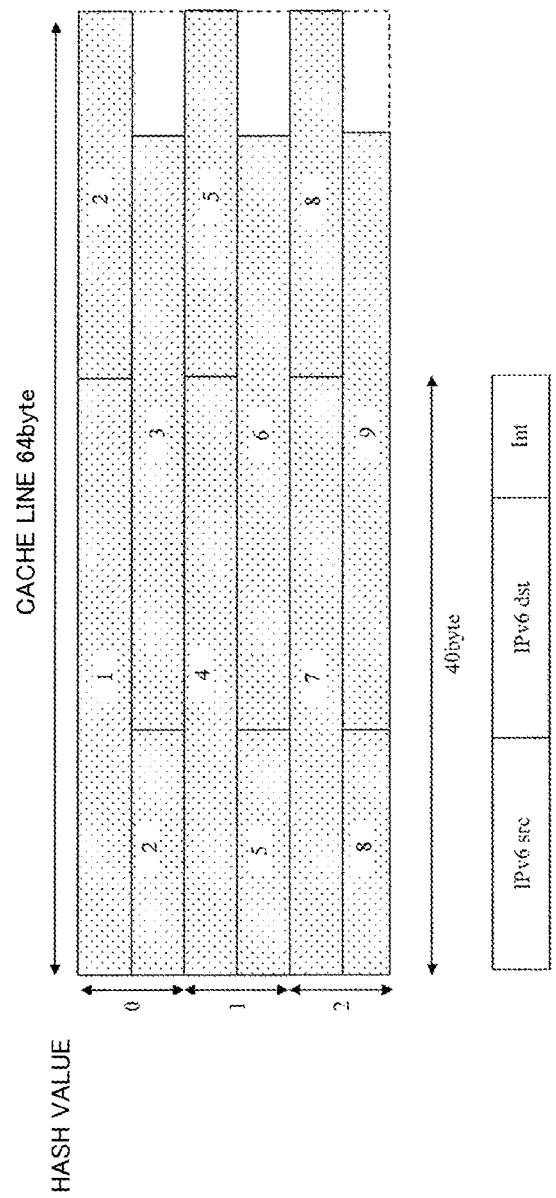
FIG. 12 shows an example of a partial packed layout of IPv6 pairs.

Third layout method: An intermediate layout between the first layout method and the second layout methods, i.e., the partial packed layout (FIG. 12)

(Number of Memory Accesses)

FIG. 13 shows the number of additional cache line accesses in successively inserting different uniform random elements into the hash table, where the available memory area is 1 GiB ($1024^3$ bytes), that is, $2^{24}$ cache lines are available in terms of the number of cache lines. Since one cache line is always accessed in the insertion operation, values obtained by subtracting one for this access were plotted. The vertical axis indicates the number of cache line accesses, and the horizontal axis indicates the number of elements added. The number of elements added is expressed as a percentage such that the maximum number of elements that can be stored with the unpacked layout is 1. This is because the unpacked layout has the smallest number of elements that can be stored, of the three layout methods.

It can be confirmed from FIG. 13 that the unpacked layout minimizes the number of memory accesses when the number of elements to be inserted 40 or less of the maximum number of elements that can be stored with the unpacked layout, and the partial-packed layout minimizes the number of memory accesses when it is over 40%.

(Data Layout Determination Method)

The traffic feature value calculation unit 14 forecasts the number of flows to be observed in the next measurement zone (between the measurement result output and the next result output) based on the history of past traffic feature values. The flow data layout determination unit 15 compares this value with the maximum number of elements that can be stored with the unpacked layout to select the layout so as to minimize the number of memory accesses.

General time-series forecast can be used to forecast the number of flows. For example, the following methods can be used.

Use the previous value
Autoregressive model
Moving average model
Autoregressive and moving average model
Autoregressive, integrated and moving average model Based on FIG. 13, the unpacked layout is used when the forecast result is 40% or less of the maximum number of elements that can be stored with the unpacked layout, and the partial packed layout is used when it is over 40%.

3.3.3 Measurement of Each Ipv6 5Tuple

First, two data layout methods will be described, as with IPv4 5Tuple. Next, quantitative comparison of the number of memory accesses between the layouts will be described. Lastly, the method for determining the data layout will be described based on the above.

(Data Layout Method)

The following two memory layout methods will be considered.

Figure 14:
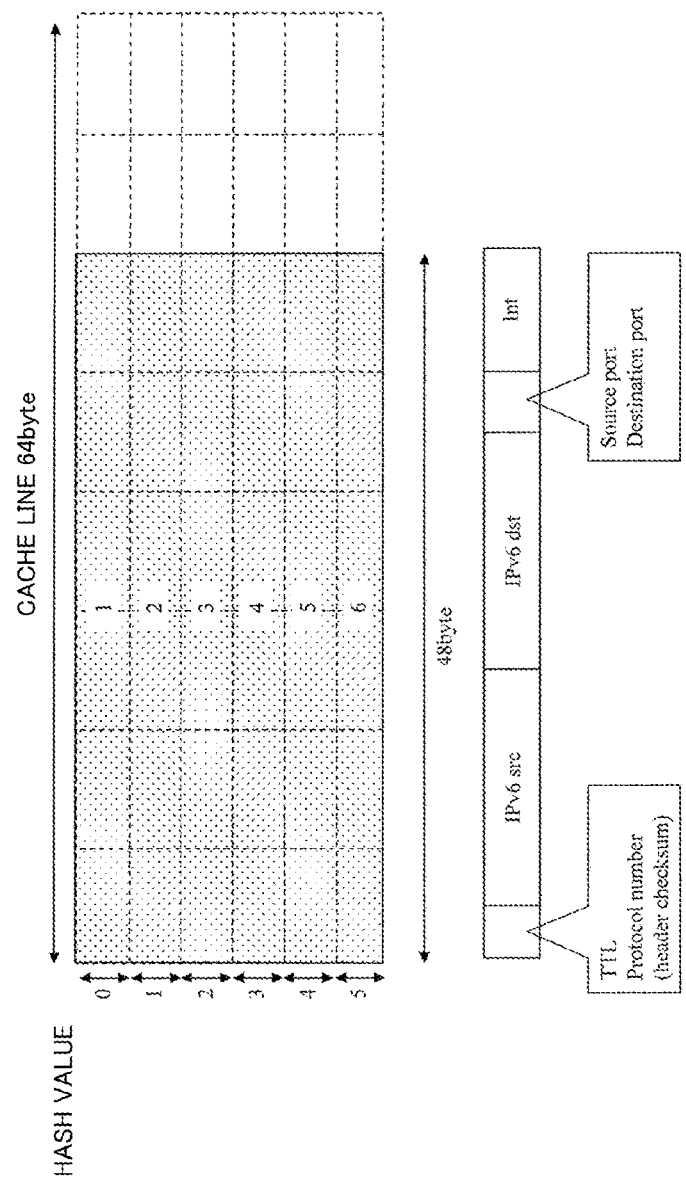
FIG. 14 shows an example of an unpacked layout of IPv6 5Tuple.
Figure 15:
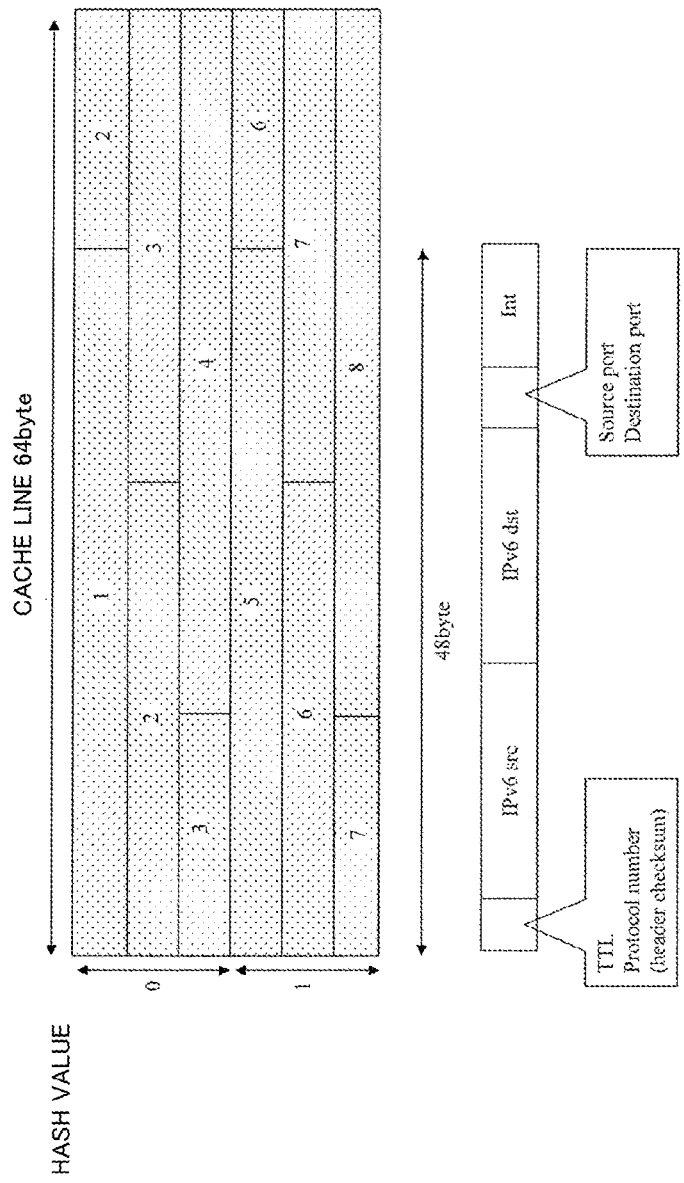
FIG. 15 shows an example of a packed layout of IPv6 5Tuple.

First layout method: A data layout on a cache line-by-cache line basis, i.e., the unpacked layout (FIG. 14)
Second layout method: A layout in which elements are spread all over the memory area, i.e., the packed layout (FIG. 15)

Note that the layout in IPv4 5Tuple and IPv6 Pair equivalent to the partial packed layout is not possible because the element size is larger than the cache line size.

(Number of Memory Accesses)

Figure 16:
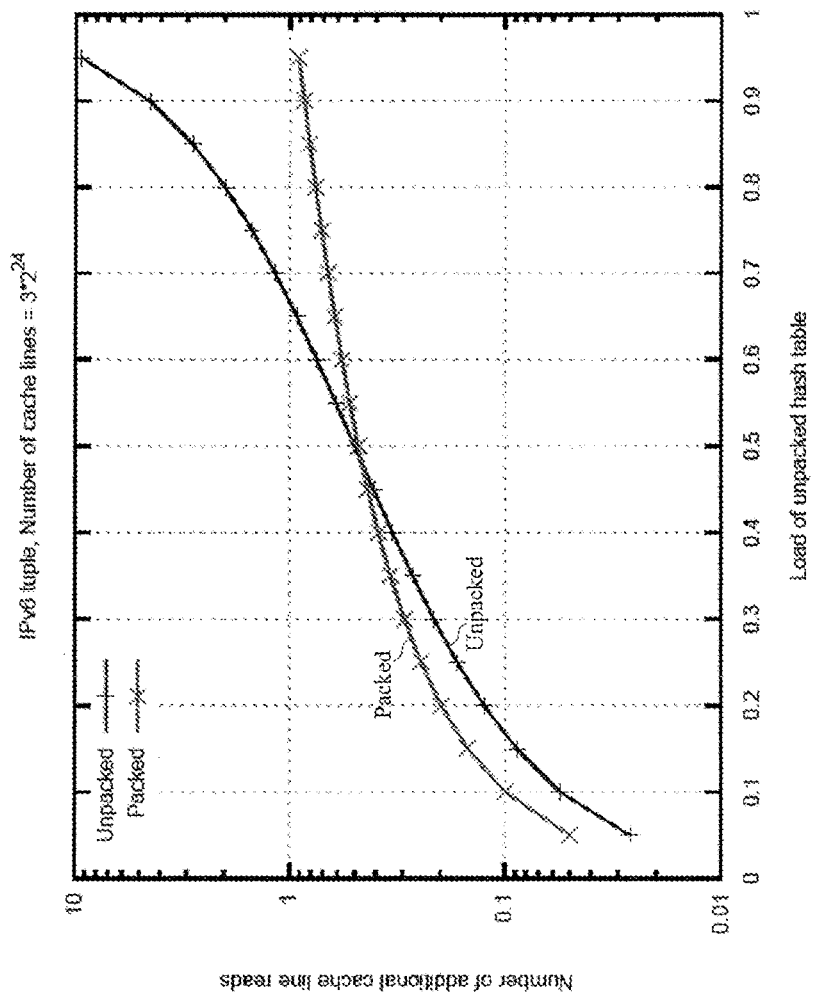
FIG. 16 shows an example of number of memory accesses in IPv6 5Tuple measurement.

FIG. 16 shows the number of additional cache line accesses in successively inserting different uniform random elements into the hash table, where the available memory area is 3 GiB ($3 \times 1024^3$ bytes), that is, $3 \times 2^{24}$ cache lines are available in terms of the number of cache lines. Since one cache line is always accessed in the insertion operation, values obtained by subtracting one for this access were plotted. The vertical axis indicates the number of cache line accesses, and the horizontal axis indicates the number of elements added. The number of elements added is expressed as a percentage such that the maximum number of elements that can be stored with the unpacked layout is 1. This is because, of the two layout methods, the unpacked layout has the smaller number of elements that can be stored.

It can be confirmed from FIG. 16 that the unpacked layout minimizes the number of memory accesses when the number of elements to be inserted is 45% or less of the maximum number of elements that can be stored with the unpacked layout, and the packed layout minimizes the number of memory accesses when it is over 45%.

(Data Layout Determination Method)

The traffic feature value calculation unit 14 forecasts the number of flows to be observed in the next measurement zone (between the measurement result output and the next result output) based on the history of past traffic feature values. The flow data layout determination unit 15 compares this value with the maximum number of elements that can be stored with the unpacked layout to select the layout so as to minimize the number of memory accesses.

General time-series forecast can be used to forecast the number of flows. For example, the following methods can be used.

Use the previous value
Autoregressive model
Moving average model
Autoregressive and moving average model
Autoregressive, integrated and moving average model Based on FIG. 16, the unpacked layout is used when the forecast result is 45% or less of the maximum number of elements that can be stored with the unpacked layout, and the packed layout is used when it is over 45%.

4. Effects of the Disclosed Technique

In order to achieve IP flow measurement, which is typical IP traffic measurement, for high-speed traffic, it is necessary to update a counter for each received packet at high speed. The disclosed technique reduces the number of memory accesses during the counter update processing and finishes the processing at high speed, thus making it possible to also achieve IP flow measurement for high-speed traffic.

(Points of the Invention)

To achieve high-speed IP flow measurement on a general-purpose server, the number of memory accesses in counter update processing needs to be reduced. This is because the memory access speed is relatively slow compared to the calculation speed of the CPU. The flow information and the metadata layout method are flexible, and the number of memory accesses is different depending on the layout method and the number of elements to be stored. The number of memory accesses can be reduced by forecasting the number of flows to arrive and changing memory layout methods.

(Supplementary Note 1)

A traffic monitoring device including:
 a packet receiving unit for extracting flow information and metadata from a received packet;
 a flow data recording unit for searching for a recording area of a hash table in a memory based on the flow information, and recording the flow information and the metadata;
 a flow data output unit for reading all entries of the hash table in the memory at regular time intervals, writing the read entries to an external recording medium to persisting the read entries, and initializing the hash table in the memory;
 a traffic feature value calculation unit for forecasting the number of flows in the next measurement zone from time-series data of the number of previously measured flows; and
 a flow data layout method determination unit for selecting a memory layout method so as to minimize the number of memory accesses based on a flow type and the forecasted number of flows in the next measurement zone, wherein the flow data recording unit and the flow data output unit function in accordance with the memory layout method selected by the flow data layout method determination unit.

(Supplementary Note 2)

A traffic monitoring method including:

extracting flow information and metadata from a received packet, with use of a packet receiving unit;

searching for a recording area of a hash table in a memory based on the flow information and recording the flow information and metadata, with use of a flow data recording unit; and reading all entries of the hash table in the memory at regular time intervals, writing the read entries to an external recording medium to persist the read entries, and initializing the hash table in the memory, with use of a flow data output unit, wherein a traffic feature value calculation unit forecasts the number of flows in the next measurement zone from time-series data of the number of previously measured flows, a flow data layout method determination unit selects a memory layout method so as to minimize the number of memory accesses based on a flow type and the forecasted number of flows in the next measurement zone, and the flow data recording unit and the flow data output unit function in accordance with the memory layout method selected by the flow data layout method determination unit.

(Supplementary Note 3)

A traffic monitoring program for causing a computer to function as a traffic monitoring device, the program causing the computer to execute steps of:

extracting flow information and metadata from a received packet, with use of a packet receiving unit;

searching for a recording area of a hash table in a memory based on the flow information and recording the flow information and metadata, with use of a flow data recording unit; and reading all entries of the hash table in the memory at regular time intervals, writing the read entries to an external recording medium to persist the read entries, and initializing the hash table in the memory, with use of a flow data output unit, wherein a traffic feature value calculation unit forecasts the number of flows in the next measurement zone from time-series data of the number of previously measured flows, a flow data layout method determination unit selects a memory layout method so as to minimize the number of memory accesses based on a flow type and the forecasted number of flows in the next measurement zone, and the flow data recording unit and the flow data output unit function in accordance with the memory layout method selected by the flow data layout method determination unit.

INDUSTRIAL APPLICABILITY

The present disclosure is applicable to information and communication industries.

REFERENCE SIGNS LIST

10 Traffic monitoring device
11 Packet receiving unit
12 Flow data recording unit
13 Flow data output unit
14 Traffic feature value calculation unit
15 Flow data layout determination unit

The invention claimed is:

1. A device that monitors traffic in a network, the device comprising
    a memory configured to record, for each flow in the network, metadata and flow information to be used in IP flow measurement,
    wherein a traffic state is forecasted using a packet flowing in the network; and
    a recording area for the metadata and the flow information in the memory is set based on the forecasted traffic state.

2. The traffic monitoring device according to claim 1, further comprising:
    a packet receiving unit, including one or more processors, configured to receive a packet and extract the metadata and the flow information from the received packet;
    a flow data recording unit, including one or more processors, configured to search for the recording area in the memory based on the flow information, and record the metadata and the flow information in the recording area searched for;
    a flow data output unit, including one or more processors, configured to output the metadata and the flow information recorded in the memory to outside, and initialize the metadata and the flow information recorded in the memory;
    a traffic feature value calculation unit, including one or more processors, configured to forecast a future traffic state using information retrievable from the packet received by the packet receiving unit; and
    a flow data layout method determination unit, including one or more processors, configured to set the recording area in the memory based on the traffic state forecasted by the traffic feature value calculation unit,
    wherein the flow data recording unit is configured to search for the recording area in the memory based on the flow information in accordance with the setting by the flow data layout method determination unit, and
    the flow data output unit is configured to read the metadata and the flow information recorded in the memory in accordance with the setting by the flow data layout method determination unit.

3. The traffic monitoring device according to claim 2, wherein
    the recording area in the memory is a hash table constructed in a cache memory, and
    the flow data layout method determination unit is configured to select one of the following layout methods (i), (ii), and (iii) so as to minimize the number of cache line accesses:
    (i) a first layout method in which the metadata and the flow information are laid out in a cache line different for each flow;
    (ii) a second layout method in which the metadata and the flow information are spread without gaps in each cache line; and
    (iii) a third layout method in which the metadata and the flow information are laid out so that the number of flows each of which is laid out in one cache line is more than the number of flows each of which is laid out while divided into two cache lines.

4. A traffic monitoring method to be executed by a traffic monitoring device that monitors traffic in a network, the traffic monitoring device including a memory configured to record, for each flow in the network, metadata and flow information to be used in IP flow measurement, the method comprising:

forecasting a traffic state using a packet flowing in the network; and setting a recording area for the metadata and the flow information in the memory based on the forecasted traffic state.

5. The traffic monitoring method according to claim 4, further comprising:

outputting, by the traffic monitoring device, the metadata and the flow information recorded in the memory to outside at regular time intervals, and initializing, by the traffic monitoring device, the metadata and the flow information recorded in the memory, and setting, by the traffic monitoring device, the recording area for the metadata and the flow information in the memory based on the forecasted traffic state, triggered by the initialization of the metadata and the flow information recorded in the memory.

6. The traffic monitoring method according to claim 5, wherein the recording area in the memory is a hash table constructed in a cache memory, and the traffic monitoring method further comprises:

selecting one of the following layout methods (i), (ii), and (iii) so as to minimize the number of cache line accesses:

(i) a first layout method in which the metadata and the flow information are laid out in a cache line different for each flow;

(ii) a second layout method in which the metadata and the flow information are spread without gaps in each cache line; and (iii) a third layout method in which the metadata and the flow information are laid out so that the number of flows each of which is laid out in one cache line is more than the number of flows each of which is laid out while divided into two cache lines.

7. A non-transitory computer-readable storage medium storing a traffic monitoring program to be executed by a traffic monitoring device that monitors traffic in a network, the traffic monitoring device including a memory that records, for each flow in the network, metadata and flow information to be used in IP flow measurement, the traffic monitoring program causing the traffic monitoring device to execute steps of:

forecasting a traffic state using a packet flowing in the network; and setting a recording area for the metadata and the flow information in the memory based on the forecasted traffic state.

8. The non-transitory computer-readable storage medium according to claim 7, wherein the traffic monitoring program further causes the traffic monitoring device to execute:

outputting the metadata and the flow information recorded in the memory to outside at regular time intervals, and initializing the metadata and the flow information recorded in the memory, and setting the recording area for the metadata and the flow information in the memory based on the forecasted traffic state, triggered by the initialization of the metadata and the flow information recorded in the memory.

9. The non-transitory computer-readable storage medium according to claim 8, wherein the recording area in the memory is a hash table constructed in a cache memory, and the traffic monitoring program further causes the traffic monitoring device to execute:

selecting one of the following layout methods (i), (ii), and (iii) so as to minimize the number of cache line accesses:

(i) a first layout method in which the metadata and the flow information are laid out in a cache line different for each flow;

(ii) a second layout method in which the metadata and the flow information are spread without gaps in each cache line; and (iii) a third layout method in which the metadata and the flow information are laid out so that the number of flows each of which is laid out in one cache line is more than the number of flows each of which is laid out while divided into two cache lines.

* * * * *